United States Patent [19]

Narikiyo et al.

[11] Patent Number: 5,004,149
[45] Date of Patent: Apr. 2, 1991

[54] CENTRAL AIR CONDITIONING SYSTEM HAVING COMPENSATING CONTROL FUNCTION FOR TOTAL HEAT LOAD IN A PLURALITY OF ROOMS

[75] Inventors: Hidetoshi Narikiyo; Yukifumi Gotou; Yoshihiro Chuma, all of Shizuoka, Japan

[73] Assignee: Kabushiki Kaisha Toshiba, Kanagawa, Japan

[21] Appl. No.: 433,654

[22] Filed: Nov. 8, 1989

[30] Foreign Application Priority Data

Jan. 24, 1989 [JP] Japan .................................. 1-14602
Jan. 24, 1989 [JP] Japan .................................. 1-14603

[51] Int. Cl.⁵ ............................................... F24F 7/00
[52] U.S. Cl. ...................................... 236/49.3; 165/22
[58] Field of Search ................ 62/228.4; 236/49.3; 165/22

[56] References Cited

U.S. PATENT DOCUMENTS

| | | | |
|---|---|---|---|
| 3,568,760 | 3/1971 | Hogel | 165/22 |
| 4,635,445 | 1/1987 | Otsuka et al. | 62/158 |
| 4,732,318 | 3/1988 | Osheroff | 236/49.3 |
| 4,754,919 | 7/1988 | Otsuka et al. | 236/49.3 |

FOREIGN PATENT DOCUMENTS

| | | |
|---|---|---|
| 3123649 | 11/1982 | Fed. Rep. of Germany ........ 165/22 |
| 60-47497 | 10/1985 | Japan . |
| 2183018A | 5/1987 | United Kingdom . |
| 2194651A | 3/1988 | United Kingdom . |
| 2215867A | 9/1989 | United Kingdom . |

Primary Examiner—William E. Wayner
Attorney, Agent, or Firm—Philip M. Shaw, Jr.

[57] ABSTRACT

A central air conditioning system includes a compensating control function in which the prescribed target temperature Tfs of the conditioned air supplied from the air conditioning apparatus to a main duct is changed from the original value to a prescribed value of a modified target temperature Tfm to establish the target temperature Tfs when the actual room temperature Ta in each room does not achieve a corresponding desired room temperature Ts even though the damper of the corresponding air volume control unit is positioned at either the fully opened position or the closed position. The temperature of the conditioned air from the air conditioning apparatus is controlled in accordance with the target temperature Tfs, and the target temperature Tfs of the conditioned air is further changed to successive values of the modified target temperature Tfm until the actual room temperature Ta in each room achieves the corresponding desired room temperature Ts.

10 Claims, 6 Drawing Sheets

CENTRAL AIR CONDITIONING SYSTEM HAVING COMPENSATING CONTROL FUNCTION FOR TOTAL HEAT LOAD IN A PLURALITY OF ROOMS

BACKGROUND OF THE INVENTION

1. Field of the invention

This invention relates, in general, to air conditioning systems. In particular, the invention relates to a system in which a conditioned air is simultaneously supplied to a plurality of rooms to be air-conditioned from one air conditioning apparatus through a duct.

2. Description of the related art

A conventional central air conditioning system typically includes one air conditioning source and a duct which communicates with a plurality of rooms to be air-conditioned through corresponding paths to simultaneously control the temperature in the rooms. The conventional air conditioning system usually is provided with an automatic air volume control function, i.e., a so-called VAV (variable air volume) unit. In VAV unit, a damper and an air volume sensor are arranged in the path formed between the duct and each room, and the opening degree of each damper is controlled on the basis of the heat load of the corresponding rooms. In other words, the volume of the conditioned air fed from the air conditioning source to each room is determined based on the difference between a desired room temperature set by the thermostat provided in each room and a detected room temperature (actual room temperature).

In the above-described conventional air conditioning system including the VAV unit, the temperature of the conditioned air fed from the air conditioning source is previously set at a desirable level through the operation panel or the remote controller of the air conditioning source, and the temperature of each room is controlled by each damper which varies the volume of the conditioned air fed to each room. During the operation, the capacity of the compressor of the air conditioning source is controlled to maintain the temperature of the conditioned air fed from the air conditioning source at a set level. The total flow rate of the conditioned air is controlled by the fan device. Furthermore, in this system, a minimum volume of air fed to each room is set to secure a suitable volume of air ventilating each room, and the volume of air fed into each room is controlled such that it is not reduced below the minimum volume of air. In other words, a damper is not fully closed even though further supplying of the conditioned air in the corresponding room is not required. Thus some conditioned air is always supplied into the room until the air conditioning source stops. Thus, if the heat load in each room is smaller than the heating/cooling capacity of the air conditioning source corresponding to the previously set temperature of the conditioned air fed from the air conditioning source, each room may be heated or cooled in excess as long as the air conditioning source is operating even though each damper is at the closed position and the capacity of the fan device is at the minimum value. When the heat load in each room becomes greater than the heating/cooling capacity of the air conditioning source, the temperature of each room may not reach the desired temperature set by the thermostat even though each damper is fully opened and the capacity of the fan device is at the maximum level.

SUMMARY OF THE INVENTION

Accordingly, it is an object of the present invention to achiéve an optimum air conditioning to a plurality of rooms to be air-conditioned in a central air conditioning system.

It is another object of the invention to avoid excessive cooling/heating in a central air conditioning system when the total heat load in a plurality of rooms is small, as compared with the heating/cooling capacity of the air conditioning system.

It is still another object of the invention to avoid an air conditioning system, wherein conditioned air is channeled through a main duct to a plurality of rooms to be air-conditioned, is comprised of air conditioning means for generating conditioned air at a target temperature Tfs having an original value and for forcibly supplying the conditioned air to the main duct. Further included are air volume control means, corresponding to each room, for regulating the amount of the conditioned air from the main duct to the corresponding room, the air volume control means including a damper and means for moving the damper between a first predetermined position wherein the maximum amount of the conditioned air flows through the damper and a second predetermined position wherein the minimum amount of the conditioned air flows through the damper. A room temperature sensor means, corresponding to each room, detects an actual room temperature Ta of the corresponding room. A control signal producing means, including means for comparing the actual room temperature Ta of each room with a corresponding desired room temperature Ts, produces a first value of a modified target temperature Tfm different from the original value and changes the target temperature Tfs from the original value to the first value of the modified target temperature Tfm to establish the target temperature Tfs of the conditioned air from the air conditioning means when the actual room temperature Ta in at least one of the rooms does not reach the corresponding desired room temperature Ts even though the damper of the corresponding air volume control means is positioned at one of the first predetermined position and the second predetermined position. The control signal producing means further produces successive values of the modified target temperature Tfm and changes the target temperature Tfs to successive values of the modified target temperature Tfm until the actual room temperature Ta in each room to be air-conditioned reaches the corresponding desired room temperature Ts.

In another embodiment of the invention, a central air conditioning system, wherein conditioned air is channeled through a main duct to a plurality of rooms to be air-conditioned, comprises air conditioning means for generating conditioned air at a target temperature Tfs having an original value and for forcibly supplying the conditioned air to the main duct and air volume control means having a damper, corresponding to each room, for regulating the amount of the conditioned air from the main duct to the corresponding room. The air volume control means includes air volume sensor means for detecting the amount of the conditioned air feed through the damper. The air volume sensor means outputs a maximum air amount signal Sfmax when the maximum amount of the conditioned air through the damper is detected. The air volume sensor means also outputs a minimum air amount signal Sfmin when the minimum amount of the conditioned air through the damper is detected. Room temperature sensor means, corresponding to each room, detects an actual room temperature Ta of the corresponding room. Control signal producing means produces a first value of a modified target temperature Tfm different from the original value and changes the target temperature Tfs from the original value to the first value of the modified target temperature Tfm to establish the target temperature Tfs of the conditioned air from the air conditioning means when it is detected during the operation that either a first condition exists wherein the minimum air amount signal Sfmin is outputted from at least one of the air volume sensor means or a second condition exists wherein the maximum air amount signal Sfmax is outputted from each air volume sensor means. The control signal producing means further produces successive values of the modified target temperature Tfm and changes the target temperature Tfs to successive values of the modified target temperature Tfm until the actual room temperature Ta in each room reaches the corresponding desired room temperature Ts.

BRIEF DESCRIPTION OF THE DRAWINGS

These and other objects and advantages of this invention will become more apparent and more readily appreciated from the following detailed description of the presently preferred exemplary embodiment of the invention, taken in conjunction with the accompanying drawings, wherein like reference numerals throughout the various figures denote like structure elements and wherein.

DETAILED DESCRIPTION OF THE PREFERRED EMBODIMENTS

Two preferred embodiments of the present invention will be described in more detail with reference to the accompanying drawings.

Figure 1:
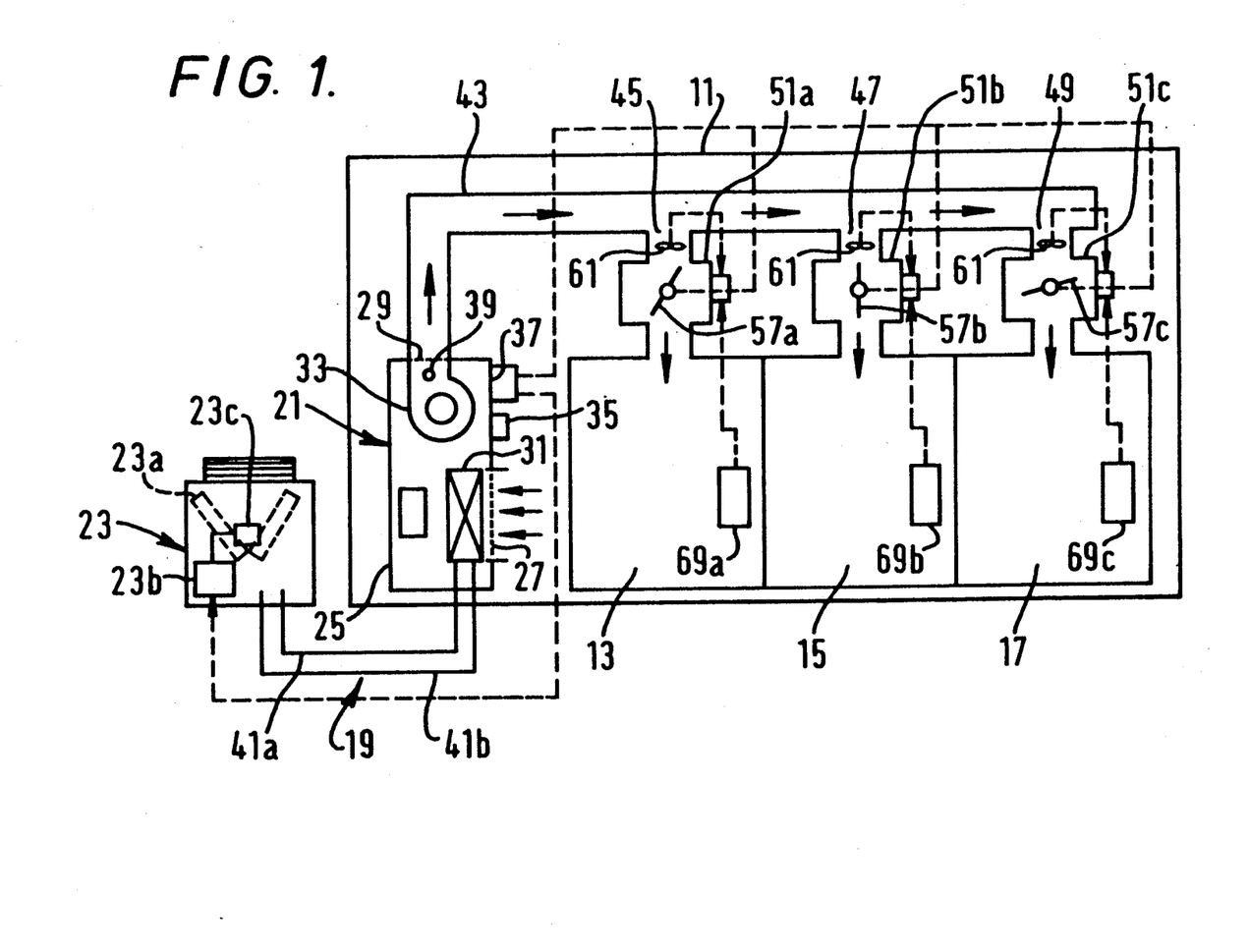
FIG. 1 is a schematic view illustrating an air conditioning system which constitutes one embodiment of the present invention.

As shown in FIG. 1, a building 11 includes first, second and third room spaces 13, 15 and 17 to be air-conditioned. A heat pump type air conditiOning apparatus 19, i.e., air conditioning means, includes an internal unit 21 disposed in building 11 and an external unit 23. Internal unit 21 may be disposed in the ceiling of building 11. Internal unit 21 includes a casing 25 wherein an intake opening 27 is formed in the side wall thereof and a discharge opening 29 is formed in the upper wall thereof. An internal heat exchanger 31 is arranged at the inside of casing 25 opposite to intake opening 27. A variable capacity internal fan 33 is attached to the inner surface of the upper wall of casing to be in communication with discharge opening 29. A fan speed control inverter 35 is attached to the outer surface of the side wall of casing 25 and is connected to variable capacity internal fan device 33 through a system controller 37 to control the rotational speed of fan device 33. A temperature sensor 39 is disposed in internal fan device 33 to detect the temperature of the conditioned air blowing off from internal fan device 33. External unit 23 includes an external heat exchanger 23a, a variable capacity compressor 23b and a compressor speed control inverter 23c. Refrigerant flows from compressor 23b to external heat exchanger 23a in external unit 23 (in cooling mode), and further flows in internal heat exchanger 31 in internal unit 21. Thus, refrigerant is circulated between external unit 23 and internal unit 21 through a pair of refrigerant pipes 41a, 41b to perform a refrigerating cycle.

As shown in FIG. 1, one of the ends of an elongated main duct 43 is in communication with discharge opening 29, and the other end thereof is closed. A plurality of openings 45, 47 and 49 are formed in the portions of main duct 43 corresponding to first, second and third room spaces 13, 15 and 17. A plurality of variable air volume units 51a, 51b and 51c, i.e. air volume control means, (hereinafter referred as a VAV unit) are connected between the openings 45, 47 and 49 of main duct 43 and the first, second and third room spaces 13, 15 and 17 to supply the conditioned air from internal fan 33 to each room 13, 15 and 17.

Figure 2:
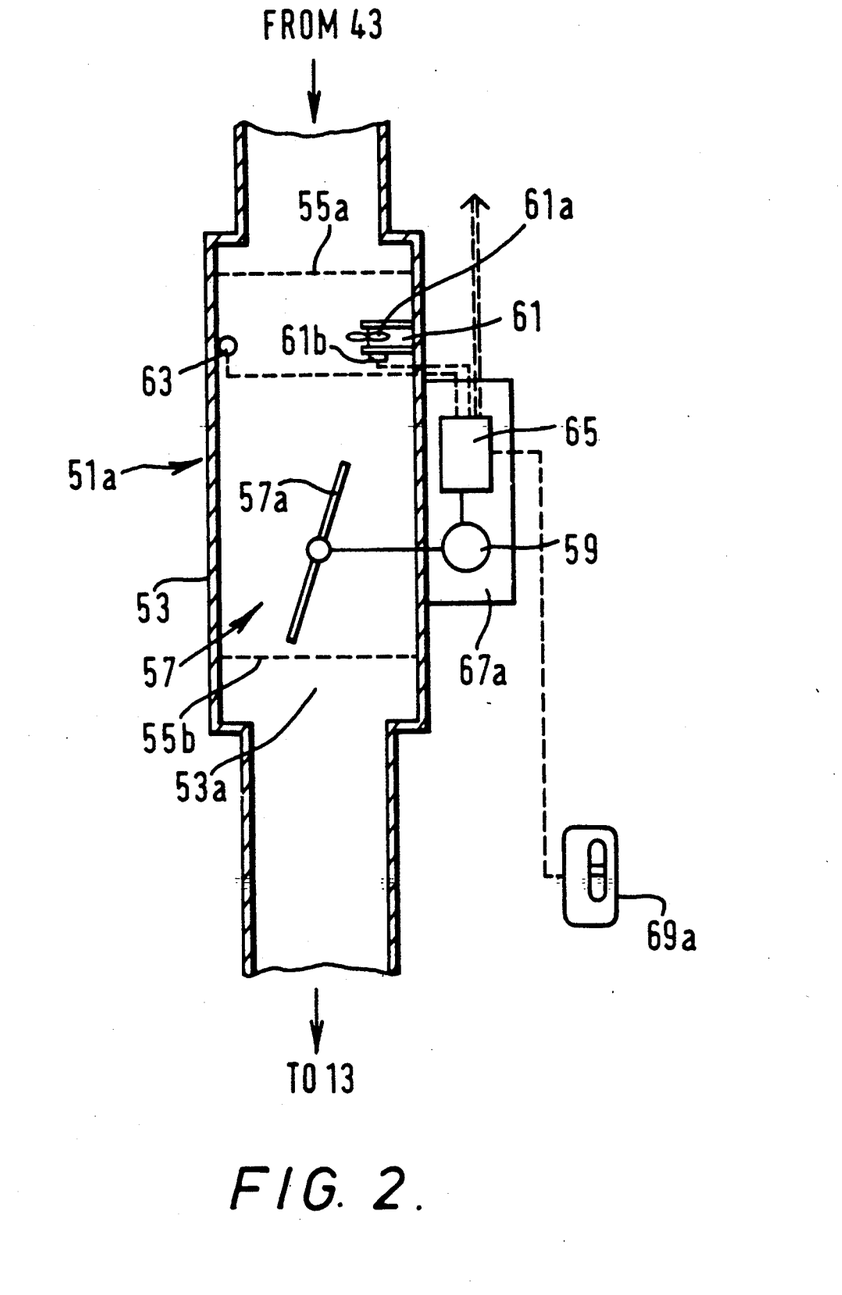
FIG. 2 is an enlarged vertical section view illustrating a variable air volume device shown in FIG. 1.

Since the construction of each VAV unit is similar to every other, the construction of only one of the VAV units 51a will be described. As shown in FIG. 2, VAV unit 51a includes a duct 53 for defining an air passage 53a therein. One of the ends of duct 53 is in communication with opening 45 of main duct 43, and the other end thereof is in communication with room space 13 to channel the conditioned air to room space 13. A pair of air permeable screens 55a, 55b is disposed across air passage 53a in duct 53. One of the screens 55a is disposed at main duct 43 side and the other screen 55b is disposed at the room 13 side to define an operational space 57 therebetween. A damper 57a is rotatably disposed across air passage 53a in operational space 57 to control the flow of the conditioned air supplied from main duct 43 to room 13. Damper 57a is rotated by a motor 59 disposed outside of the duct 53 to regulate the opening degree thereof. A wind velocity sensor 61 is arranged between damper 57a and the one of the screens 55a in duct 53 to detect the flow speed of the conditioned air in duct 53. Wind velocity sensor 61 includes a propeller 61a rotating in response to the flow speed of the conditioned air in duct 53, and a rotational speed detection element 61b for detecting the rotational speed of propeller 61a to measure the amount of the conditioned air fed through damper 57a. A temperature sensor 63 is also disposed between damper 57a and the screen 55a to detect the temperature of the conditioned air flowing through duct 53. Each detection signal from wind velocity sensor 61 and temperature sensor 63 is input to a control circuit 65 arranged in a control box 67a attached to the outer wall of duct 53. The above-described motor 59 is also disposed in control box 67a.

As shown in FIGS. 1 and 2, a room thermostat 69a is provided in room 13. A temperature output signal is fed to control circuit 65 from a temperature sensor (not shown) in room thermostat 69a. A control signal is fed from control circuit 65 to system controller 37 of internal unit 21. A user can input a desired room temperature in room 13 to control circuit 65 through room thermostat 69a. Remaining rooms 15 and 17 are also each provided with a room thermostat 69b, 69c. A temperature output signal is fed from each room thermostat 69b, 69c to the corresponding control circuit 65 for that room. A control signal is fed from each control circuit 65 to the system controller 37. A user can also input a desired temperature in each room 15, 17 to the corresponding control circuits 65 through the respective room thermostats 69b, 69c. The conditioned air supplied from fan device 33 of internal unit 21 through main duct 43 is channelled to rooms 13, 15 and 17 through the corresponding VAV units 51a, 51b, 51c. Thus, the temperature in each room 13, 15, 17 is controlled by the corresponding VAV units 51a, 51b, 51c.

The operation of the above-described air conditioning system will now be described. Desired room temperatures Ts are, respectively, set to each control circuit 65 through the corresponding room thermostats 69a, 69b, 69c. In a practical manner, the desired room temperature Ts in each room 13, 15, 17 may be different from one another. An operation mode, e.g., cooling mode, is set to system controller 37 of air conditioning apparatus 19 before the start/stop switch (not shown) in each thermostat 69a, 69b, 69c is operated. A target temperature Tfs of the conditioned air fed from fan device 33 is also set to system controller 37. Then, air conditioning apparatus 19 is in a standby position until at least one of the start/stop switches of the thermostats 69a, 69b, or 69c is operated.

When one of the start/stop switches is operated, air conditioning apparatus 19 shifts from the standby position to the operation position. The control circuit 65 to which a start signal is fed from the start/stop switch drives both external unit 23 and fan speed control inverter 35 through system controller 37 to perform the refrigerating cycle. In practice, the start/stop switches of all room thermostats 69a, 69b and 69c are not always operated. However, in this case, the operation of this system will be described on the assumption that all start/stop switches are operated. When external unit 23 is operated, compressor 23b is driven to perform a cooling cycle. External heat exchanger 23a acts as a condenser and internal heat exchanger 31 acts as an evaporator. Refrigerant output from compressor 23b circulates between external unit 23 and internal unit 21 through the pair of refrigerant pipes 41a, 41b. Air in building 11 is taken into internal unit 21 through intake opening 27 by fan device 23. Thus, intaken air is cooled by internal heat exchanger 31 and is forcibly supplied to each room 13, 15, 17 through main duct 43 and the corresponding VAV units 51a, 51b and 51c. At this time, each control circuit 65 detects the heat load, i.e., difference between the desired room temperature Ts and the actual temperature Ta, in the corresponding rooms 13, 15 and 17. Then, system controller 37 controls the output frequency of fan speed control inverter 35 based on the total heat load of rooms 13, 15, 17 to control the rotational speed of fan device 33. Thus, the amount of the conditioned air, i.e., cooled air, fed from fan device 33 is controlled. Furthermore, each control circuit 65 regulates the opening degree of the corresponding dampers 57a, 57b and 57c in accordance with the detected hear load in each room. Each control circuit 65 carries out a suitable air volume control based on the detection results of each wind velocity sensor 61 and temperature sensor 63. During the above-described operation, the compressing capacity of compressor 23b is controlled through compressor speed control inverter 23c to maintain the temperature of the conditioned air at the target temperature Tfs, as detected by temperature sensor 39.

In the cooling mode, if the actual room temperature Ta detected by room thermostat, e.g., 69a is high, as compared with the desired room temperature Ts, the opening degree of damper 57a is varied toward the fully opened position to increase the amount of the conditioned air fed to room 13. If the actual temperature Ta in room 13 is lower than the desired room temperature Ts, the opening degree of damper 57a is varied toward the closed position to reduce the amount of the conditioned air supplied to room 13. The other dampers 57b and 57c are also controlled as the same manner as the above-described control operation.

During the above-described damper control operation, if at least one of the dampers, e.g., 57a is at the fully opened position, and the required amount of the conditioned air is insufficient, the corresponding control circuit 65 sends a signal to system controller 37 to increase the output frequency of fan speed control inverter 35. The rotational speed of fan device 33 is increased, and thus, the amount of the conditioned air fed from fan device 33 increases. If all of dampers 57a, 57b and 57c are not at the fully opened position and the required amount of the conditioned air supplied to each of the rooms 13, 15 and 17 is sufficient, each control circuit 65 outputs a signal to system controller 37 to decrease the output frequency of fan speed control inverter 35. The rotational speed of fan device 33 is decreased and the amount of the cooled air is reduces until the opening degree of at least one of the dampers 57a, 57b, 57c approaches the fully opened position to save the total energy of the system.

Furthermore, the actual temperature Tfa of the conditioned air fed from fan device 33 is detected by temperature sensor 39. Based on the detection result, the output frequency of compressor speed control inverter 23c is changed to vary the compressing capacity of compressor 23b until the actual temperature Tfa of the conditioned air fed from fan device 33 coincides with the target temperature Tfs. However, during the above-described operation, it may occur that the actual room temperature Ta of each room 13, 15, 17 does not approach the desired room temperature Ts if the heat load in each room 13, 15, 17 is extremely large.

The air conditioning system of the above-described embodiment is provided with a compensating control function wherein the initial target temperature Tfs of the conditioned air fed from fan device 33 is modified to form a modified target temperature Tfm and the compressing capacity of compressor 23b is further controlled by a control signal generated by system controller 37 to make the actual temperature Tfa of the conditioned air fed from fan device 33 coincide with the modified target temperature Tfm. When the compensating control is carried out, the actual room temperature in each room is compared with the corresponding desired room temperature in corresponding control circuit 65. System controller 37 acts as control signal producing means which produces successive values of a modified target temperature and changes an original value of the target temperature of the conditioned air fed from fan device 33 to a first value of the modified target temperature to control the capacity of compressor 23b. If the actual room temperature of each room does not achieve the corresponding desired room temperature, the target temperature is further changed to a value next to the first value of the successive values of the modified target temperature.

Figure 3:
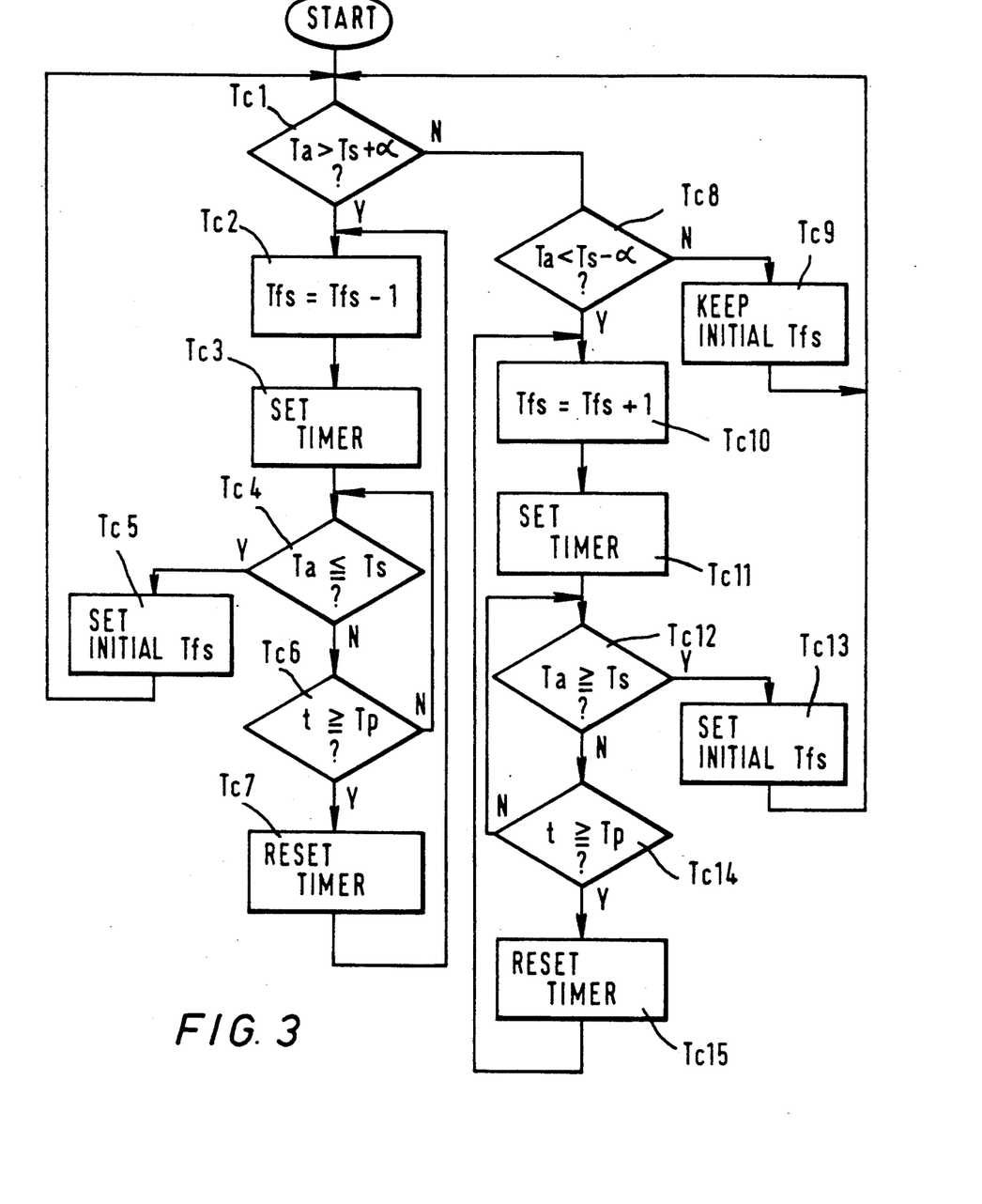
FIG. 3 is a flow-chart illustrating the compensating control in the cooling mode of the system of FIG. 1.

The compensating control function in the cooling mode will be described with reference to FIG. 3. The four-way valve (not shown) in external unit 23 is changed to the cooling position. External heat exchanger 23a acts as a condenser and internal heat exchanger 31 acts as an evaporator in the cooling mode. In step Tc1, each actual room temperature Ta is compared with a first value F1 determined by adding a predetermined value α, e.g., 1° C., to a desired room temperature Ts. The first value F1 is a maximum air volume set temperature value of each VAV unit 51a, 51b, 51c in the cooling mode. If the actual room temperature Ta of one of the rooms, e.g., 13 is greater than the first value Fl, the YES-path is taken. Otherwise, the NO-path is taken. When the above-described condition, i.e., Ta>Ts+α, is satisfied in the cooling mode, damper 57a is situated at a fully opened position wherein the maximum volume of the conditioned air flows through damper 57a and the total heat load of each room 13, 15, 17 is greater than the cooling capacity of compressor 23b. Thus, room 13 is not cooled to a desirable level. In step Tc2, a prescribed temperature value, e.g., 1° C., is subtracted from the target temperature Tfs of the conditioned air fed from fan device 33. Thus, in the cooling mode, the output frequency of compressor speed control inverter 23c is increased to increase the rotational speed of compressor 23b. The actual temperature Tfa of the conditioned air fed from fan device 33 is decreased to the modified target temperature Tfm, i.e., Tfs−1° C. The above-described operation results in decrease in the actual room temperature Ta. In step Tc3, a timer (not shown) in control circuit 65 begins the counting operation. In step Tc4, the actual room temperature Ta of room 13 is compared with a desired room temperature Ts of room 13 set by room thermostat 69a. If the actual room temperature Ta is equal to or smaller than the desired room temperature Ts, the YES-path is taken. Otherwise, the NO-path is taken. When the YES-path is taken in step Tc4, the target temperature of the conditioned air fed from fan device 33 is changed from the modified target temperature Tfm to the initial target temperature Tfs (step Tc5). Then, the timer is reset and the above-described initial step Tc1 is re-executed. When the NO-path is taken in step Tc4, the count value t of the timer is compared with a prescribed value Tp (step Tc6). If the count value t is equal to or greater than the prescribed value Tp, the YES-path is taken. The timer is reset (step Tc7), and the above-described step Tc2 is re-executed. When the NO-path is taken in step Tc6, the above-described step Tc4 is re-executed.

When the NO-path is taken in step Tc1, each actual room temperature Ta is compared with a second value F2 determined by subtracting the predetermined value α, e.g., 1° C., from the desired room temperature Ts (step Tc8). The second value F2 is a minimum air volume set temperature value of each VAV unit 51a, 51b, 51c in the cooling mode. If the actual room temperature Ta of one of the rooms, e.g., 15 is smaller than the second value F2, the YES-path is taken. Otherwise, the NO-path is taken. When the above-described condition, i.e., Ta<Ts−α, is satisfied in the cooling mode, damper 57b is situated at a closed position at which the minimum volume of the conditioned air flows through damper 57b, and the total heat load of each room 13, 15, 17 is smaller than the cooling capacity of compressor 23b. Thus, room 15 is cooled in excess. However, if the actual room temperature Ta is greater than the second value F2, i.e. Ts−α, room 15 is cooled at a desirable level. The initial target temperature Tfs of the conditioned air is maintained (step Tc9), and the above-described initial step Tc1 is re-executed. When the YES-path is taken in step Tc8, a prescribed temperature value, e g., 1° C., is added to the target temperature Tfs of the conditioned air (step Tc10). Thus, in the cooling mode, the output frequency of compressor speed control inverter 23c is decreased to decrease the rotational speed of compressor 23b. The actual temperature Tfa of the conditioned air is increased to the modified target temperature Tfm, i.e., Tfs+1° C. The above-described operation results in an increase in the actual room temperature Ta. In step Tc11, the timer (not shown) in control circuit 65 begins the counting operation. In step Tc12, the actual room temperature Ta of room 15 is compared with the desired room temperature Ts of room 15. If the actual room temperature Ta is equal to or greater than the desired room temperature Ts, the YES-path is taken. Otherwise, the NO-path is taken. When the YES-path is taken in step Tc12, the set temperature of the conditioned air fed from fan device 33 is changed from the modified target temperature Tfm to the initial target temperature Tfs (step Tc13). Then, the timer is reset and the above-described initial step Tc1 is re-executed. When the NO-path is taken in step Tc12, the count value t of the timer is compared with the prescribed value Tp (step Tc14). If the count value t is equal to or greater than the prescribed value Tp, the YES-path is taken. The timer is reset (step Tc15), and the above-described step Tc10 is re-executed. When the NO-path is taken in step Tc14, the above-described step Tc12 is re-executed. The above-described steps are repeatedly executed until the start/stop switch (not shown) of each room thermostat 69a, 69b, 69c is re-operated. It should be noted that the above-described compensating control is carried out by each control circuit 65.

Figure 4:
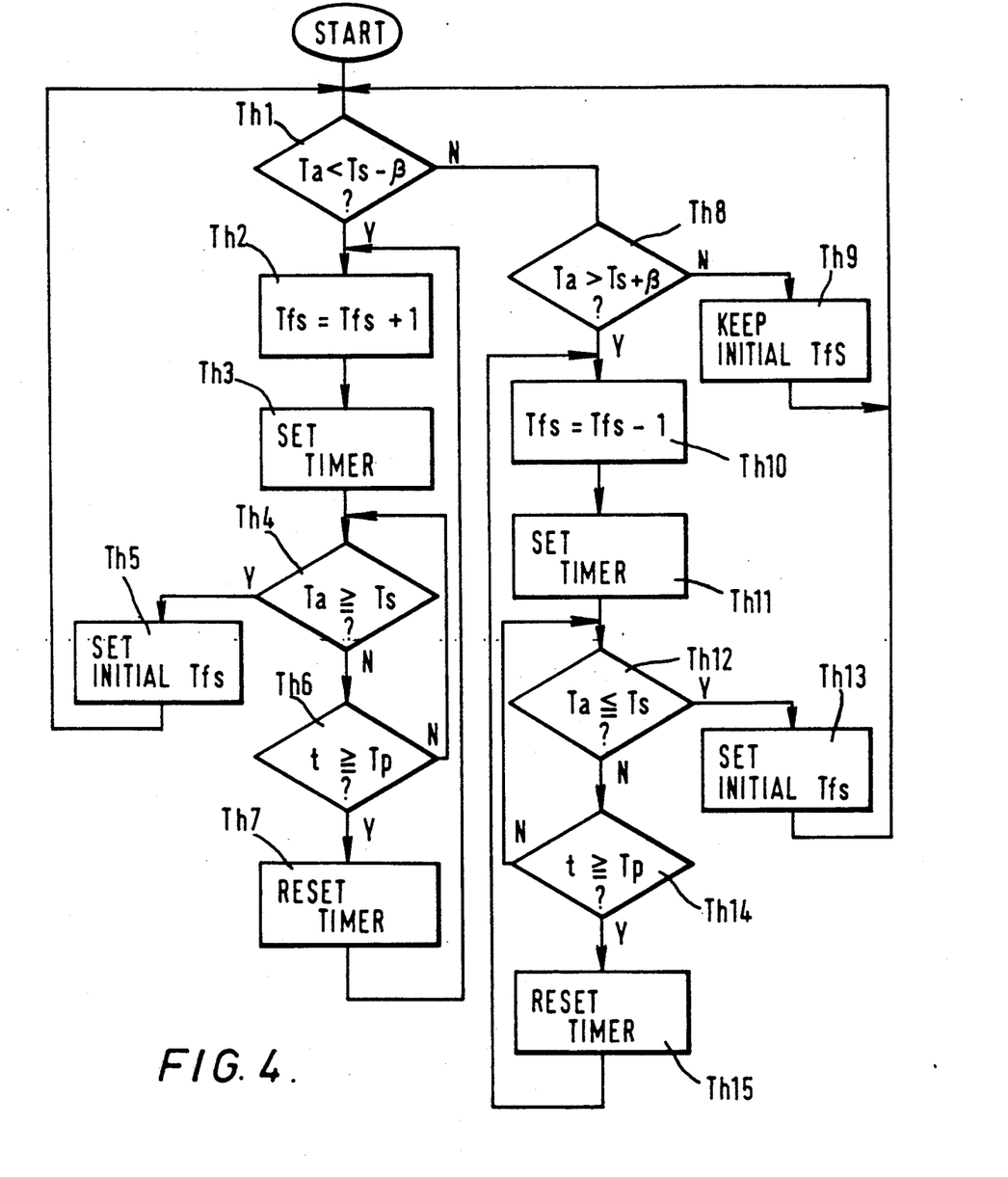
FIG. 4 is a flow-chart illustrating the compensating control in the heating mode of the system of FIG. 1.

FIG. 4 is a flow-chart showing a compensating control function in the heating mode of the first embodiment. In this case, the four-way valve is changed from the cooling position to the heating position. External heat exchanger 23a acts as an evaporator and internal heat exchanger 31 acts as a condenser. In step Th1, each actual room temperature Ta is compared with a third value F3 determined by subtracting a predetermined value β, e.g., 1° C., from a desired room temperature Ts. The third value F3 is a maximum air volume set temperature value of each VAV unit 51a, 51b, 51c in the heating mode. In step Th1, if the actual room temperature Ta of one of the rooms, e.g., 13 is smaller than the third value F3, the YES-path is taken. Otherwise, the NO-path is taken. When the above-described condition, i.e., Ta<Ts−β, is satisfied in the heating mode, damper 57a is situated at a fully opened position wherein the maximum volume of the conditioned air flows through damper 57a, and the total heat load of each room 13, 15, 17 is greater than the heating capacity of compressor 23b. Thus, room 13 is not heated at a desirable level. In step Th2, a prescribed temperature value, e.g , 1° C., is added to the target temperature Tfs of the conditioned air fed from fan device 33. Thus, in the heating mode, the output frequency of compressor speed control inverter 23c is increased to increase the rotational speed of compressor 23b. The actual temperature Tfa of the conditioned air fed from fan device 33 is increased to the modified target temperature Tfm, i.e., Tfs+1° C. The above-described operation results in increase in the actual room temperature Ta. In step Th3, a timer (not shown) in control circuit 65 begins a counting operation. In step Th4, the actual room temperature Ta of room 13 is compared with a desired room temperature Ts of room 13. If the actual room temperature Ta is equal to or greater than the desired room temperature Ts, the YES-path is taken. Otherwise, the NO-path is taken. When the YES-path is taken in step Th4, the target temperature of the conditioned air fed from fan device 33 is changed from the modified target temperature Tfm to the initial target temperature Tfs (step Th5). Then, the timer is reset, and the above-described initial step Th1 is re-executed. When the NO-path is taken in step Th4, the count value t of the timer is compared with a prescribed value Tp (step Th6). If the count value t is equal to or greater than Tp, the YES-path is taken. The timer is reset (Th7), and the above-described step Th2 is re-executed. When the NO-path is taken in step Th6, the above-described step Th4 is re-executed.

When the NO-path is taken in step Th1, each actual room temperature Ta is further compared with a fourth value F4 determined by adding the predetermined value $\beta$, e.g., 1° C., to the desired room temperature Ts (step Th8). The fourth value F4 is a minimum air volume set temperature value of each AV unit 51a, 51b, 51c in the heating mode. If the actual room temperature Ta of one of the rooms, e.g., 15 is greater than the fourth value F4, the YES-path is taken. Otherwise, the NO-path is taken. When the above-described condition, i.e., Ta>Ts+$\beta$, is satisfied in the heating mode damper 57b is situated at a closed position at which the minimum volume of the conditioned air flows through damper 57b, and the total heat load of each room 13, 15, 17 is smaller than the heating capacity of compressor 23b. Thus, room 15 is heated in excess. However, if the actual room temperature Ta is smaller than the fourth value F4, i e., Ts+$\beta$, room 15 is heated at a desirable level. Therefore, when the NO-path is taken in step Th8, the initial target temperature Tfs of the conditioned air fed from fan device 33 is maintained (step Th9), and the above-described initial step Th1 is re-executed. When the YES-path is taken in step Th8, a prescribed temperature value, e.g., 1° C., is subtracted from the target temperature Tfs of the conditioned air (step Th10). Thus in the heating mode, the output frequency of compressor speed control inverter 23c is decreased to decrease the rotational speed of compressor 23b. The actual temperature Tfa of the conditioned air is decreased to the modified target temperature Tfm, i.e., Tfs−1° C. The above-described operation results in a decrease in the actual room temperature Ta. In step Th11, the timer in control circuit 65 begins a counting operation. In step Th12, the actual room temperature Ta of room 15 is compared with the desired room temperature Ts thereof. If the actual room temperature Ta is equal to or smaller than the desired rOom temperature Ts, the YES-path is taken. Otherwise, the NO-path is taken. When the YES-path is taken in step Th12, the target temperature of the conditioned air fed from fan device 33 is changed from the modified target temperature Tfm to the initial target temperature Tfs (step Th13). Then, the timer is reset and the above-described initial step Th1 is re-executed. When the NO-path is taken in step Th12, the count value t of the timer is compared with the prescribed value Tp (step Th14). If the count value t is equal to or greater than the prescribed value Tp, the YES-path is taken. The timer is reset (step Th15). and the above-described step Th10 is re-executed. When the NO-path is taken in step Th14, the above described Th12 is re-executed. The above-described steps are repeatedly executed until the start/-stop switch (not shown) of each room thermostat 69a, 69b, 69c is re-operated.

With the above-described embodiment, the initial target temperature of the conditioned air fed from fan device 33 is modified in response to the condition between the actual room temperature Ta and a prescribed value determined based on a desired room temperature Ts, and the capacity of compressor 23b is controlled to make the actual temperature of the conditioned air fed from fan device 33 coincide with the modified target temperature value. Thus, the actual room temperature is rapidly regulated to a desired room temperature even though the heat load of each room is greatly changed. An excess cooling or insufficient cooling in the cooling mode can be eliminated even though the capacity of the fan device is at the minimum value. An excess heating or insufficient heating in heating mode can also be avoided.

A second embodiment of the present invention will be described with reference to FIGS. 5 and 6. In this embodiment, each VAV unit 51a, 51b, 51c outputs an air volume signal indicating the amount of the conditioned air flowing through the corresponding dampers 57a, 57b, 57c. The above described air volume signal is used for modifying the target temperature of the conditioned air fed from fan device 33. Each VAV unit 51a, 51b, 51c detects the amount of the conditioned air flowing through the corresponding dampers 57a, 57b, 57c by each wind velocity sensor 61. Each VAV unit 51a, 51b, 51c outputs the air volume signal Sfa. When each damper 57a, 57b, 57c is disposed at the fully opened position, each VAV unit 51a, 51b, 51c outputs a maximum air volume signal Sfmax. When each damper 57a, 57b, 57c is disposed at the closed position, each VAV unit 51a, 51b, 51c outputs a minimum air volume signal Sfmin.

Figure 5:
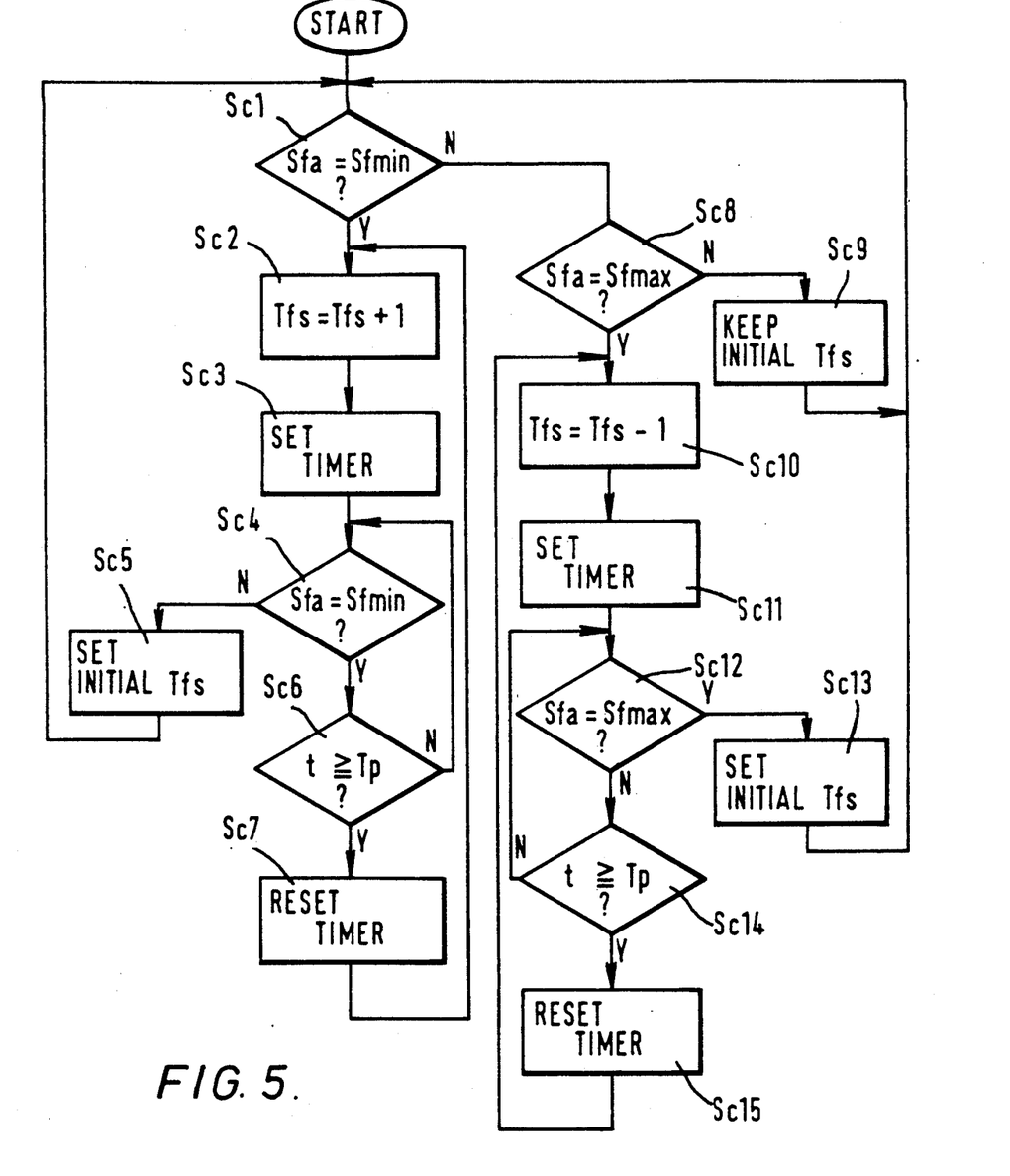
FIG. 5 is a flow-chart illustrating &he compensating control in the cooling mode of a second embodiment of the invention.

FIG. 5 is a flow-chart showing the compensating control in the cooling mode. In the cooling mode, external heat exchanger 23a acts as a condenser and internal heat exchanger 31 acts as an evaporator. In step Sc1, air volume signal Sfa fed from each VAV unit& 51a, 51b, 51c is compared with a minimum air volume signal Sfmin. If the air volume signal Sfa fed from at least one of the VAV units 51a, 51b, 51c is equal to the minimum air volume signal Sfmin, the YES-path is taken. Otherwise, the NO-path is taken. In Sc2, a prescribed temperature value, e.g., 1° C., is added to the target temperature Tfs of the conditioned air fed from fan device 33. As stated before, the rotational speed of compressor 23b decreases and the actual temperature Tfa of the conditioned air fed from fan device 33 increases to the modified target temperature Tfm, i.e., Tfs+1° C. As a result, the actual room temperature Ta increases. In step Sc3, a timer (not shown) in control circuit 65 begins a counting operation. In step Sc4, the air volume signal Sfa is compared with the minimum air volume signal Sfmin. If the air volume signal Sfa is equal to the minimum air volume signal Sfmin, the YES-path is taken. Otherwise, the NO-path is taken. When the NO-path is taken in stp Sc4, the target temperature of the conditioned air fed from fan device 33 is changed from the mOdified target temperature Tfm to the initial target temperature Tfs (step Sc5). The timer is reset and the above-described initial step Sc1 is re-executed. When the YES-path is taken in step Sc4, the count value t of the timer is compared with a prescribed value Tp (step Sc6). If the count value t is equal to or greater than the prescribed value Tp, the YES-path is taken. The timer is reset (step Sc7), and the above-described step Sc2 is re-executed. When the NO-path is taken in step Sc6, the above-described step Sc4 is re-executed. When the NO-path is taken in step Sc1, each air volume signal Sfa fed from each VAV unit 51a, 51b, 51c is compared with a maximum air volume signal Sfmax (step Sc8). If the air volume signal Sfa output from each VAV unit 51a, 51b, 51c is equal to the maximum air volume signal Sfmax, the YES-path is taken. Otherwise, the NO-path is &taken. If the maximum air volume signal Sfmax is not output from at least one of the VAV units 51a, 51b, 51c, it is determined that the total heat load of each room 13, 15, 17 is smaller than the cooling capacity of compressor 23b, and each room is cooled at a desireable level. Thus, the initial target temperature Tfs of the conditioned air is maintained (step Sc9), and the above-described initial step Sc1 is re-executed. When the YES-path is taken in step Sc8, the target temperature Tfs of the conditioned air is decreased by a prescribed temperature value, e.g., 1° C., (step Sc10). As stated before, the rotational speed of compressor 23b increases and the actual temperature Tfa of the conditioned air fed from fan device 33 decreases to the modified target temperature Tfm, i.e., Tfs−1° C. As a result, the actual room temperature Ta decreases. In step Sc11, the timer (not shown) in control circuit 65 begins the counting operation. In step Sc12, the air volume signal Sfa is compared with a maximum air volume signal Sfmax. If the air volume signal Sfa is equal to the maximum air volume signal Sfmax, the YES-path is taken. Otherwise, the NO-path is taken. When the NO-path is taken, the target temperature of the conditioned air fed from fan device 33 is changed from the modified target temperature Tfm to the initial target temperature Tfs (step Sc13). The timer is reset and above-described initial step Sc1 is re-executed. When the YES-path is taken in step Sc12, the count value of the timer is compared with a prescribed value Tp (step Sc14). If the count value t is equal to or greater than the prescribed value Tp, the YES-path is taken. The timer is reset (step Sc15), and the above-described step Sc10 is re-executed. When the NO-path is taken in step Sc14, the above-descried step Sc12 is re-executed. The above-described steps are repeatedly executed until the start/stop switch (not shown) of each room thermostat 69a, 69b, 69c is re-operated.

Figure 6:
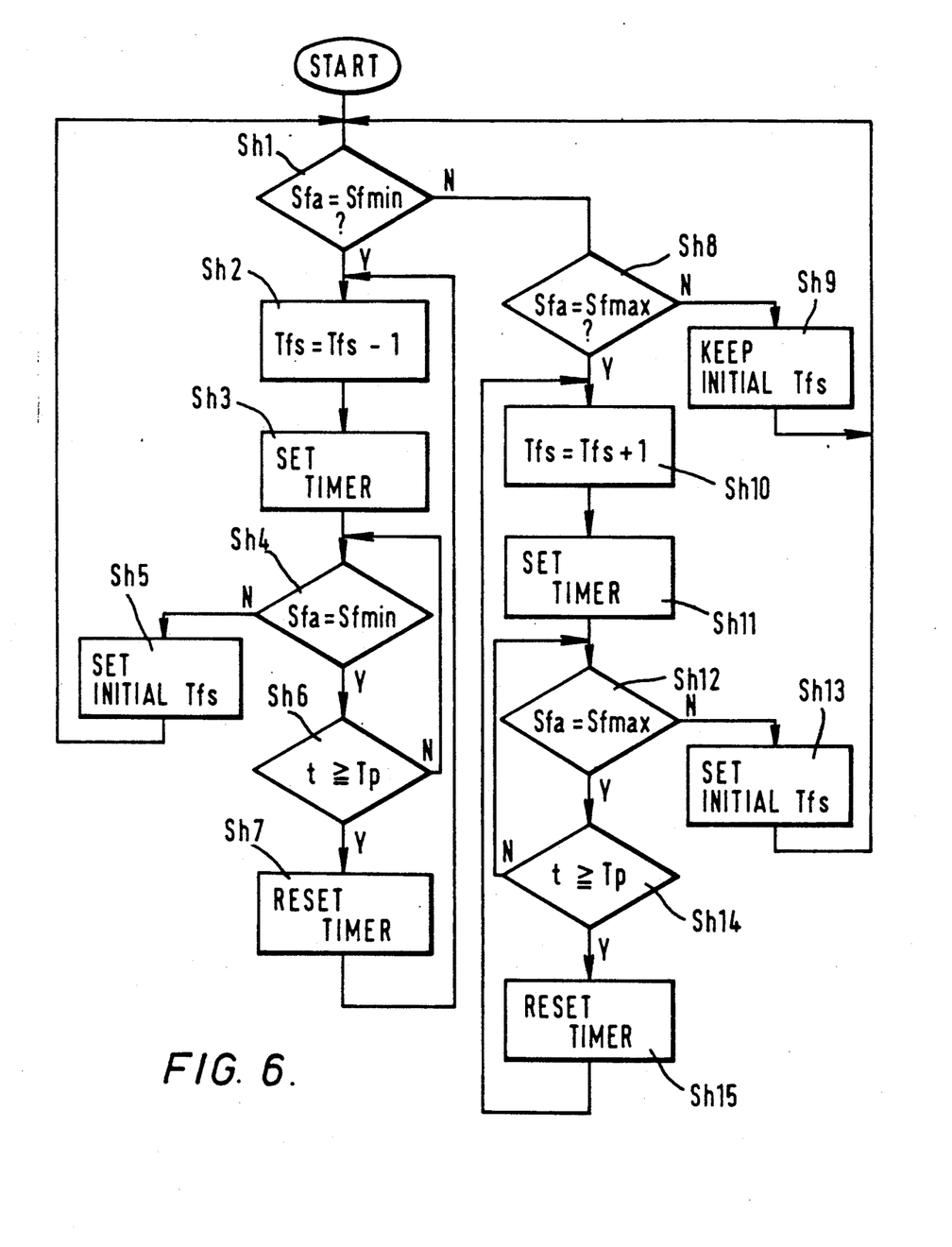
FIG. 6 is a flow-chart illustrating the compensating control in the heating mode of the second embodiment.

FIG. 6 is a flow-chart showing a compensating control in the heating mode of the second embodiment. In FIG. 6, only steps Sh2 and Sh10 are different from steps Sc2 and Sc10 in FIG. 5. In step Sh2, a prescribed temperature value, e.g., 1° C., is subtracted from the target temperature Tfs of the conditioned air fed from fan device 33. This is because, if the air volume signal Tfa output from at least one of the VAV units 51a, 51b, 51c is equal to the minimum air volume signal Tfmin in the heating mode, the corresponding room is heated in excess. Thus, the heating capacity of compressor 23b is decreased to make the temperature of the conditioned air coincide with the modified target temperature Tfm, i.e., Tfs−1° C. If the minimum air volume signal is still output from at least one of the VAV units 51a, 51b, 51c, the target temperature of the conditioned air is further decreased. On the other hand, a prescribed temperature value, e.g., 1° C., is added to the target temperature Tfs of the conditioned air fed from fan device 33 (step Sh10). In this case, the total heat load of each room 13, 15, 17 is greater than the heating capacity of compressor 23b, and each room 13, 15, 17 is not heated at a desirable level. Thus, the heating capacity of compressor 23b is increased to make the temperature of the conditioned air coincide with the modified target temperature Tfm, i.e., Tfs+1° C. If the maximum air volume signal Sfmax is still output from all of the VAV units 51a, 51b and 51c, the target temperature of the conditioned air is further increased. Since the other steps in FIG. 6 are similar to those in FIG. 5, the same numerals are added to each alphabetical symbolic of the same steps, and therefore, the detailed descriptions are not repeated.

With the above-described second embodiment, a similar effect to the first embodiment can be achieved.

According to the present invention, the cooling/heating capacity of the compressor can be regulated to an optimum capacity with a low power consumption even though the damper is disposed at either the fully opened position or the closed position. Thus, an excess cooling/heating at a low heat load can be avoided. An insufficient cooling/heating at a large heat load can also be avoided. Furthermore, the temperature in each room can be controlled properly even though an inadequate temperature value is initially set to a system controller as a target temperature of the conditioned air fed from the fan device.

The present invention has been described with respect to specific embodiments. However, other embodiments based on the principles of the present invention should be obvious to those of ordinary skill in the art. Such embodiments are intended to be covered by the claims.

What is claimed is:

1. A central air conditioning system wherein conditioned air is channeled through a main duct to a plurality of rooms to be air-conditioned, the system comprising:

air conditioning means for generating conditioned air at a target temperature Tfs having an original value and for forcibly supplying the conditioned air to the main duct;

air volume control means, corresponding to each room, for regulating the amount of the conditioned air from the main duct to the corresponding room, the air volume control means including a damper and means for moving the damper between a first predetermined position wherein the maximum amount of the conditioned air flows through the damper and a second predetermined position wherein the minimum amount of the conditioned air flows through the damper;

room temperature sensor means, corresponding to each room, for detecting an actual room temperature Ta of the corresponding room; and control signal producing means, including means for comparing the actual room temperature Ta of each room with a corresponding desired room temperature Ts, for producing a first value of a modified target temperature Tfm different from the original value and for changing the target temperature Tfs from the original value to the first value of the modified target temperature Tfm to establish the target temperature Tfs of the conditioned air from the air conditioning means when the actual room temperature Ta in at least one of the rooms does not reach the corresponding desired room temperature Ts even though the damper of the corresponding air volume control means is positioned at one of the first predetermined position and the second predetermined position, the control signal producing means further producing successive values of the modified target temperature Tfm and changing the target temperature Tfs to successive values of the modified target temperature Tfm until the actual room temperature Ta in each room to be air-conditioned reaches the corresponding desired room temperature Ts.

2. A central air conditioning system wherein conditioned air is channeled through a main duct to a plurality of rooms to be air-conditioned, the system comprising:

air conditioning means for generating conditioned air at a target temperature Tfs having an original value and for forcibly supplying the conditioned air to the main duct;

air volume control means having a damper, corresponding to each room, for regulating the amount of the conditioned air from the main duct to the corresponding room, the air volume control means including air volume sensor means for detecting the amount of the conditioned air fed through the damper, the air volume sensor means outputting a maximum air amount signal Sfmax when the maximum amount of the conditioned air through the damper is detected, the air volume sensor means also outputting a minimum air amount signal Sfmin when the minimum amount of the conditioned air through the damper is detected;

room temperature sensor means, corresponding to each room, for detecting an actual room temperature Ta of the corresponding room; and control signal producing means for producing a first value of a modified target temperature Tfm different from the original value and for changing the target temperature Tfs from the original value to the first value of the modified target temperature Tfm to establish the target temperature Tfs of the conditioned air from the air conditioning means when it is detected during the operation that either a first condition exists wherein the minimum air amount signal Sfmin is outputted from at least one of the air volume sensor means or a second condition exists wherein the maximum air amount signal Sfmax is outputted from each air volume sensor means, the control signal producing means further producing successive values of the modified target temperature Tfm and changing the target temperature Tfs to successive values of the modified target temperature Tfm until the actual room temperature Ta in each room reaches the corresponding desired room temperature Ts.

3. A system according to claim 2, wherein the control signal producing means includes means for adding a prescribed value to the original value of the target temperature Tfs of the conditioned air from the air conditioning means to obtain successive values of the modified target temperature Tfm when the first condition is detected during the operation.

4. A system according to claim 3, wherein the control signal producing means includes means for reversing the target temperature Tfs to the original value when the first condition is not detected.

5. A system according to claim 2, wherein the control signal producing means includes means for subtracting a prescribed value from the original value of the target temperature Tfs of the conditioned air from the air conditioning means to obtain successive values of the modified target temperature Tfm when the second condition is detected during the operation.

6. A system according to claim 5, wherein the control signal producing means includes means for reversing the target temperature Tfm to the original value when the second condition is not detected.

7. A system according to claim 2, wherein the control signal producing means includes means for subtracting a prescribed value from the original value of the target temperature Tfs of the conditioned air from the air conditioning means to obtain successive values of the modified target temperature Tfm when the first condition is detected during the operation.

8. A system according to claim 7, wherein the control signal producing means includes means for reversing the target temperature Tfs to the original value when the first condition is not detected.

9. A system according to claim 2, wherein the control signal producing means includes means for adding a prescribed value to the original value of the target temperature Tfs of the conditioned air from the air conditioning means to obtain successive values of the modified target temperature Tfm when the second condition is detected during the operation.

10. A system according to claim 9, wherein the control signal producing means includes means for reversing the target temperature Tfs to the original value when the second condition is not detected.

* * * * *